United States Patent [19]

Bichara et al.

[11] Patent Number: 4,504,092

[45] Date of Patent: Mar. 12, 1985

[54] TREATMENT OF CARNALLITIC ORES

[75] Inventors: Michel Bichara, Mulhouse; Jean-Pierre Koensgen, Lutterbach; Michel Bodu, Mulhouse; Michel Meriaux, Reidisheim; Jean-Pierre Zimmermann, Mulhouse, all of France

[73] Assignee: Mines de Potasse d'Alsace S.A., Mulhouse, France

[21] Appl. No.: 355,057

[22] Filed: Mar. 5, 1982

[30] Foreign Application Priority Data

Mar. 5, 1981 [FR] France ................................. 81 04391

[51] Int. Cl.³ .......................... C01D 3/08; E21B 43/28
[52] U.S. Cl. ..................................... 299/5; 23/302 R; 23/302 T; 209/166; 209/167; 423/178; 423/179; 423/197
[58] Field of Search ............... 423/179, 197, 209, 207, 423/178; 209/166, 167; 299/5; 23/302 R, 302 T

[56] References Cited

U.S. PATENT DOCUMENTS

| | | | |
|---|---|---|---|
| 2,046,312 | 7/1936 | Anderson | 209/167 |
| 2,604,988 | 7/1952 | Colin et al. | 209/166 |
| 2,689,649 | 9/1954 | Atwood | 209/166 |
| 2,702,121 | 2/1955 | Colin et al. | 209/166 |
| 2,968,525 | 1/1961 | Clark et al. | 209/166 |
| 3,009,575 | 11/1961 | Keen et al. | 209/166 |
| 3,304,249 | 2/1967 | Katz | 423/659 |
| 3,355,212 | 11/1967 | Day | 299/5 |
| 3,442,553 | 5/1969 | Kutz | 423/179 |
| 3,596,763 | 8/1971 | Berthon et al. | 209/166 |
| 3,644,102 | 2/1972 | Svanoe | 23/302 |
| 3,817,972 | 6/1974 | Grannen | 209/166 |
| 3,994,531 | 11/1976 | Dillard et al. | 23/302 R |

FOREIGN PATENT DOCUMENTS

| | | | |
|---|---|---|---|
| 613526 | 1/1961 | Canada | 423/179 |
| 1142802 | 1/1963 | Fed. Rep. of Germany | 423/179 |
| 1191492 | 2/1958 | France . | |
| 1462849 | 11/1966 | France | 423/179 |
| 842682 | 7/1960 | United Kingdom | 423/179 |

OTHER PUBLICATIONS

Kirk-Othmer, *Encyclopedia of Chemical Technology*, Second Edition, vol. 9, John Wiley and Sons, (1966), pp. 380–385.

*Primary Examiner*—Edward J. Meros
*Assistant Examiner*—Wayne A. Langel
*Attorney, Agent, or Firm*—Millen & White

[57] ABSTRACT

In a treatment of carnallitic ores by treatment with a decomposition-brine containing amounts of $MgCl_2$, KCl and NaCl suitable for precipitating artificial sylvinite in a solution of $MgCl_2$ saturated in KCl and NaCl, the improvement of adding to said decomposition-brine a collector, e.g., a fatty amine acetate, for the flotation of KCl and a source of gas, preferably a gas-liberating additive such as $H_2O_2$, so as to contact newly formed crystal nucleii of KCl selectively with said collector and to contact bubbles of said gas with said collector so as to form a froth enriched in KCl simultaneously with the decomposition of said carnallite, the process being particularly useful for treatment of underground carnallitic ore whereby the froth and brine are withdrawn at the surface, separated, and the brine, after make-up additions, is recycled to the ore formation.

18 Claims, No Drawings

TREATMENT OF CARNALLITIC ORES

BACKGROUND OF THE INVENTION

The present invention relates to a process of treatment of carnallitic ores for recovering the potassium chloride contained therein.

Carnallite is a specific mineral having the following formula: $KCl.MgCl_2.6H_2O$. It appears as an impurity in substantial quantities in some potash-bearing ores, and it can even be the major constituent of certain ore layers. It is also produced by crystallization in the evaporation of some natural brines.

For treating carnallite, whatever it's source, it is known to contact the carnallite with a brine to destroy the crystalline structure of the mineral. Such a brine, hereinafter called decomposition-brine, contains amounts of $MgCl_2$, KCl and NaCl such that potassium chloride and sodium chloride are precipitated in a brine saturated in NaCl and KCl. Therefore, after decomposition of the carnallite, there is obtained a solid mixture of sodium and potassium chloride, often called "artificial sylvinite". This sylvinite is treated by known processes such as flotation or fractional precipitation to obtain commercial grade potassium chloride. For further details, refer for example to "Faith, Keys and Clark's Industrial Chemicals", Lowenheim and Moran, 4th Edition, 1975, John Wiley and Sons, New York and London, pages 666–668.

When carnallite is in the form of a carnallitic ore layer, this layer can be worked by conventional deep mining techniques adapted to the ore, and the withdrawn ore is then treated above ground by decomposing it with the decomposition-brine so as to recover artificial sylvinite. It has also been proposed to dissolve the carnallite underground by injecting into the ore layer a brine having a composition suitable for dissolving the carnallite without forming sylvinite. The resultant solution is pumped up to surface installations where it is concentrated by evaporation in order to recrystallize carnallite. The precipitated carnallite is thereafter treated as described above to recover artificial sylvinite. In this dissolution process, the amount of brine consumed is large, and therefore the energy necessary for evaporating the brine and recrystallizing carnallite is also considerable.

To avoid the use of large quantities of brines which must be concentrated in a subsequent step, it has been attempted to decompose carnallite in the underground ore layer and to recover artificial sylvinite directly from the so-formed cavity. But the sylvinite has a propensity to deposit on the walls and on the bottom of the cavity and cannot be repulped or set into suspension. Therefore, heretofore, this technique has led only to the recovery of mostly the magnesium chloride and that fraction of potassium chloride remaining dissolved in the carnallite decomposition-brine. The amount of potassium chloride recoverable by this process represents only 15 to 20% of the total amount of KCl contained in the ore.

SUMMARY

An object of the present invention is to provide an improved recovery of KCl from carnallitic ores.

Upon further study of the specification and appended claims, further objects and advantages of this invention will become apparent to those skilled in the art.

To attain these objects, the ore is contacted with a decomposition-brine containing amounts of $MgCl_2$, KCl and NaCl suitable for precipitating artificial sylvinite in a solution of $MgCl_2$ saturated in KCl and NaCl, said decomposition-brine further containing a collector for the flotation of KCl and a source of gas bubbles.

It was observed that the collector adheres on the crystal nuclei of KCl obtained by decomposition of carnallitic ore. Thus, particles of KCl both hydrophobic and aerophilic are obtained. The bubbles of gas selectively attach on the potassium chloride particles made aerophilic by the collector and carry them up to the surface of the brine.

This process can be operated in any unit where carnallitic ore is decomposed in a brine in order to precipitate artificial sylvinite. According to the present process, the decomposition of carnallitic ore and the separation of the sylvinite are advantageously performed simultaneously. This is particularly beneficial when the ore is decomposed in situ, as a pulp of sylvinite containing NaCl and KCl precipitated by decomposition is brought up to the surface. A preconcentration of the sylvinite in the cavity takes place and thus the sylvinite brought up to the surface is concentrated in KCl.

The collector can be any collector selective for KCl, preferably those known for the flotation of sylvinite. It is for example a fatty amine or a mixture of fatty amines containing 12 to 20 carbon atoms or a salt of these amines or a mixture of amines. The salt is preferably a chlorhydrate or an acetate. The preferred collector used thus is an acetate of fatty amines containing 12 to 16 carbons.

Additives capable of liberating a gas in the brine include, but are not limited to, bicarbonates, an azonitrile, a N-nitroso compound or a peroxide in a suitable medium. An industrial product which does not react with the constituents of the ore, such as hydrogen peroxide is preferably used, for example in the form of aqueous solutions, e.g., about 3% to 90%, $H_2O_2$.

The collector is generally used in amounts ranging between 200 and 3000 g per metric ton of extracted KCl.

The amounts of gas liberating additive in the brine vary with the additive used. In the case of hydrogen peroxide the range is between 10 and 100 kg of $H_2O_2$ per metric ton of extracted KCl.

When the carnallitic ore is decomposed underground in situ, the decomposition-brine on the one hand and the collector and gas bubbles source on the other hand are injected either through separate pipes or together through the same pipe. The collector and the bubbles of liberated gas selectively attach to precipitated KCl and carry it up to the surface of the brine in the cavity in the form of a froth. The froth is carried up by the ascending flow of brine towards a suitable drawing off pipe. On the surface, the froth containing the artificial sylvinite is separated from the brine and may be concentrated further in KCl either by washing or by any other process known for preparing an enriched grade of KCl.

Part of the brine separated from the froth can be reinjected into the cavity in order to generate the appropriate ascending flow. Together with the brine a certain amount of unused collector and/or source of gas are recycled thus lowering their consumption. Makeup components are added to the recycled brine so as to reconstitute the original concentrations of salts, collector and gas. In general, the decomposition-brine used to contact the ore is substantially saturated with respect to KCl and NaCl (about 40 g/l to 60 g/l KCl and 30 g/l to 60 g/l NaCl and contain about 250 to 300 g/l $MgCl_2$.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

100 g of carnallite having the following average composition in weight:
$MgCl_2$: 31.7%
KCl: 24.8%
$H_2O$: 36.0%
NaCl: 7.0% are coarsely crushed and the particles obtained are mixed with 45 cc of solution containing 3 cc of a solution of hydrogen peroxide of sufficient strength to yield 110 liters of oxygen per liter (i.e. about 35% $H_2O_2$) and 2 cc of a 1% solution of an acetate of fatty amine of 12–16 carbon atoms. In order to recover sylvinite, a brine containing 300 g/l $MgCl_2$ and saturated in KCl and NaCl is circulated at a rate of 500 cc/h. The composition of the recycled brine is maintained. A froth is formed which is collected and dried. Also collected and dried is a residue obtained from the above treatment.

The dried froth has the following composition (by weight):
KCl: 18.04 g
NaCl: 0.25 g
$MgCl_2$: 0.72 g and contains 92.5% of KCl. This grade of CKl can be sold commercially.

The dried residue has the following composition:
KCl: 3.25 g
NaCl: 5.70 g
$MgCl_2$: 0.19 g The yield of recovered KCl relative to KCl contained in the ore is 72.5%.

EXAMPLE 2

In a block of carnallitic ore having the following dimensions: 14 cm × 19 cm × 19 cm a hole was bored. In this hole were set a first pipe for injecting the decomposition-brine and a second pipe for extracting the decomposition pulp. 420 cc/h of a brine having the following composition:
$MgCl_2$: 252 g/l
KCl: 59 g/l
NaCl: 56 g/l were injected. To this brine, there was added 18 cc of a solution containing, by volume, 6% of a 110 volume $O_2$ solution of hydrogen peroxide, 20% of a 1% solution of acetate of fatty amines as used in Example 1, and 74% of water.

The test was stopped when the dissolution reached the walls of the block. 1.6 kg of ore were dissolved. The material balance was:
Decomposition ore 1600 g containing:
$MgCl_2$: 507.2 g
KCl: 396.8 g
NaCl: 120.0 g
$H_2O$: 576.0 g Frothed dried concentrate 330 g containing:
KCl: 254.6 g or 77%
NaCl: 29.8 g
$MgCl_2$: 21.3 g
$H_2O$: 24.3 g
(crystallization water)
Rejected brine:
$MgCl_2$: 301 g/l
$KCl_2$: 45 g/l
NaCl: 36 g/l
$H_2O$: 888 g/l The yield of recovered KCl relative to KCl contained in the decomposed ore is 64.2%. By "Rejected brine" is meant the brine which is discarded or rejected.

EXAMPLE 3

In a block of carnallitic ore having the following dimensions 18 × 18 × 20 a hole having a diameter of 3.2 cm is bored down to about 1 or 2 cm from the bottom of the block; in this hole were placed two injection pipes: one for the decomposition-brine, the other one for the collector and the gas liberating agent and a third tube for extracting the pulp.

A solution containing:
20 cc of a 110 volumes $O_2$ solution of $H_2O_2$
35 cc of a 1% solution of amine acetate as used in Example 1
30 cc $H_2O$ was injected at a rate of 3 cc/h, and decomposition-brine constituted of 7 cc of $H_2O$, 483 cc of recycled brine having the following formula:
$MgCl_2$: 256 g/l
KCl: 59 g/l
NaCl: 53 g/l was injected at a rate of 400 cc/h. The recycled brine promotes the circulation of the pulp. 3.7 kg of ore were dissolved in the block and the test was stopped when the walls were reached.

| The material balance was as follows: | | | |
|---|---|---|---|
| Decomposition ore | $MgCl_2$ | 1 176 g | |
| 3 710 g | KCl | 910 g | |
|  | NaCl | 278 g | |
|  | $H_2O$ | 1 336 g | |
| Frothed dried concentrate | $MgCl_2$ | 40 g | or 4.7% by wt. |
| 855 g | KCl | 717 g | 83.9% |
|  | NaCl | 98 g | 11.5% |
| Salt remaining at | $MgCl_2$ | 1 g | |
| the bottom of the | KCl | 18 g | |
| cavity | NaCl | 5 g | |

About 35 g of frothed salt remained stuck under the roof of the cavity.

The brine at the end of the test had the following composition:
$MgCl_2$: 314 g/l
KCl: 45 g/l
NaCl: 30 g/l The yield of recovered KCl relative to the KCl contained in the ore was 78%.

The percentage of KCl in the concentrate was 83.9% without washing.

About 40% of the NaCl present in the decomposition ore was left in the cavity. This shows the selectivity of the present process.

40 kg of $H_2O_2$ and 2.3 kg of collector were used per metric ton of KCl.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the treatment of carnallitic ores comprising the steps of contacting and decomposing the ore with a decomposition-brine containing amounts of $MgCl_2$, KCl and NaCl suitable for precipitating artificial sylvinite in a solution of $MgCl_2$ saturated in KCl and NaCl, the improvement which comprises adding to said decomposition-brine a collector for the flotation of KCl and a source of gas, said source of gas being a compound capable of liberating a gas in the brine, so as to contact newly formed crystal nucleii of KCl selectively with said collector and to contact bubbles of said gas with said collector so as to form a froth enriched in KCl simultaneously with the decomposition of said carnallite.

2. A process according to claim 1, wherein the source of gas is hydrogen peroxide and the collector is a fatty acid amine or salt thereof.

3. A process according to claim 1, wherein the amount of collector ranges between 200 and 300 g per metric ton of extracted KCl.

4. A process according to claim 2, wherein the amount of collector ranges between 200 and 300 g per metric ton of extracted KCl.

5. A process according to claim 2, wherein the amount of hydrogen peroxide ranges between 10 and 100 kg per metric ton of extracted KCl.

6. A process according to claim 4, wherein the amount of hydrogen peroxide ranges between 10 and 100 kg per metric ton of extracted KCl.

7. A process according to claim 1, wherein the carnallitic ore is decomposed underground in situ, the decomposition-brine, the collector and the source of gas are injected into the ore layer, resultant froth is carried above ground by an ascending flow of brine, and then the froth is separated from the brine.

8. A process according to claim 7, wherein the source of gas is hydrogen peroxide and the collector is a fatty acid amine or salt thereof.

9. A process according to claim 8, wherein per metric ton of extracted KCl the amount of collector is 200–300 kg and the amount of hydrogen peroxide is 10–100 kg.

10. A process according to claim 7, further comprising recycling part of the brine separated from the froth into the ore layer.

11. A process according to claim 1, wherein said source of gas is an aqueous solution of about 3 to 90% $H_2O_2$.

12. A process according to claim 1, wherein said collector is a fatty amine acetate of 12 to 16 carbon atoms.

13. A process according to claim 11, wherein said collector is a fatty amine acetate of 12 to 16 carbon atoms.

14. A process according to claim 13, wherein said decomposition brine consists essentially of 40 g/l to 60 g/l KCl, 30 g/l to 60 g/l NaCl and 250 g/l to 300 g/l $MgCl_2$.

15. A process according to claim 7, wherein said source of gas is an aqueous solution of about 3 to 90% $H_2O_2$.

16. A process according to claim 7, wherein said collector is a fatty amine acetate of 12 to 16 carbon atoms.

17. A process according to claim 16, wherein said collector is a fatty amine acetate of 12 to 16 carbon atoms.

18. A process according to claim 17, wherein said decomposition brine consists essentially of 40 g/l to 60 g/l KCl, 30 g/l to 60 g/l NaCl and 250 g/l to 300 g/l $MgCl_2$.

* * * * *